United States Patent
Trampe

(10) Patent No.: US 6,698,794 B2
(45) Date of Patent: Mar. 2, 2004

(54) PROTECTOR FOR VEHICLES

(76) Inventor: Klaus Trampe, 593 Rossmore Ave., West St. Paul, Manitoba (CA), R2V 4S2

( * ) Notice: Subject to any disclaimer, the term of this patent is extended or adjusted under 35 U.S.C. 154(b) by 0 days.

(21) Appl. No.: 10/022,367

(22) Filed: Dec. 20, 2001

(65) Prior Publication Data

US 2002/0084643 A1 Jul. 4, 2002

Related U.S. Application Data

(60) Provisional application No. 60/258,542, filed on Dec. 29, 2000.

(30) Foreign Application Priority Data

Oct. 17, 2001 (CA) .............................................. 2359183

(51) Int. Cl.[7] .............................................. B62D 25/18
(52) U.S. Cl. ........................ 280/770; 280/507; 280/848
(58) Field of Search ................................. 280/770, 155, 280/768, 507, 848; 135/127, 119, 156; 150/154, 166

(56) References Cited

U.S. PATENT DOCUMENTS

| | | | | |
|---|---|---|---|---|
| 2,097,923 A | * | 11/1937 | Hutchington | 150/166 |
| 2,913,131 A | * | 11/1959 | Holmes | 280/493 |
| 3,560,013 A | * | 2/1971 | Lee | 280/493 |
| 3,670,747 A | * | 6/1972 | Pohl et al. | 135/94 |
| 3,860,266 A | * | 1/1975 | Frank et al. | 280/458 |
| 4,936,599 A | * | 6/1990 | McNamee | 280/770 |
| 4,979,776 A | * | 12/1990 | Schweickert | 296/100.15 |
| 5,560,384 A | * | 10/1996 | Oh | 135/115 |
| 5,560,412 A | * | 10/1996 | Murray | 160/67 |
| 5,732,967 A | * | 3/1998 | Behling | 280/457 |
| 5,806,873 A | * | 9/1998 | Glassman | 280/507 |
| 5,829,775 A | | 11/1998 | Maxwell et al. | 280/507 |
| 6,022,038 A | | 2/2000 | Maxwell et al. | 280/507 |
| 6,070,629 A | * | 6/2000 | Whiteside | 150/166 |
| 6,109,655 A | * | 8/2000 | Wheeler | 280/847 |
| 6,196,587 B1 | | 3/2001 | Sage | 280/770 |
| 6,371,144 B1 | * | 4/2002 | Ragatz | 150/166 |

* cited by examiner

Primary Examiner—Brian L. Johnson
Assistant Examiner—Hau Phan

(57) ABSTRACT

A vehicle protector has a sheet with peripheral channels containing an endless elasticized cable, such as a bungee cord, chock cord. At the corners exposures exposing the cable, and karabiners engage the cable and attach to eyebolts mounted on vehicles. The protector is slung below a tow bar connecting the vehicles. The sheet has side exposures exposing the endless cable, to which is attached a support bar. This has end hooks engaging the peripheral cable at the side exposures, connected by a second elasticized cable, such as a bungee cord. This second cable passes through tubes and collars so the support bar can rest on top the tow bar and support the protector at its sides. A loop of another cable, such as bungee cord, is attached by grommet and knot or ball bungee in the middle of the protector. The support bar is passed through this loop supporting the protector in the middle. A kit of protector, support bar and eyebolts is supplied. Extra exposures, karabiners and eyebolts are provided for end attachment of the protector to the towing vehicle.

18 Claims, 4 Drawing Sheets

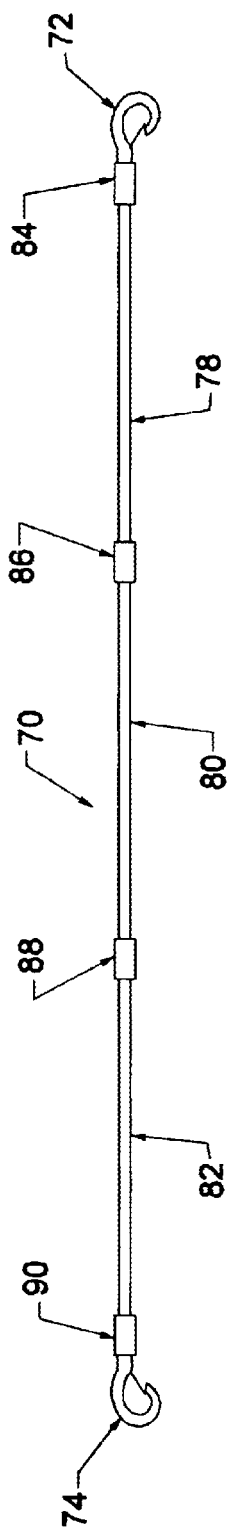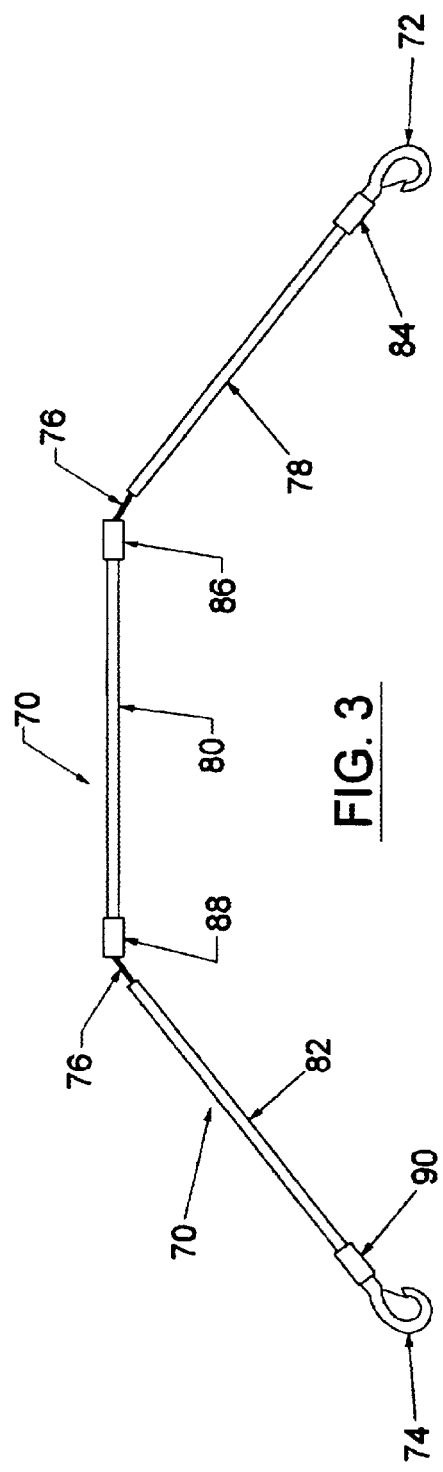

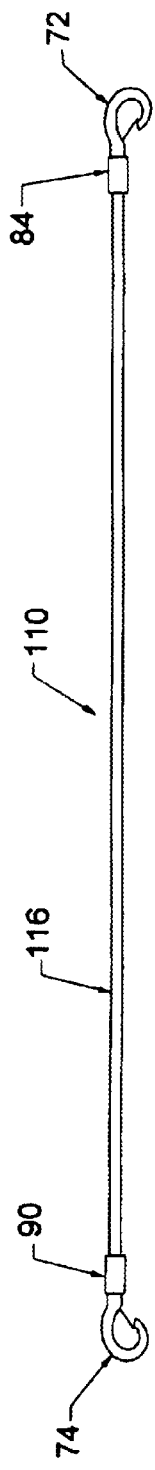
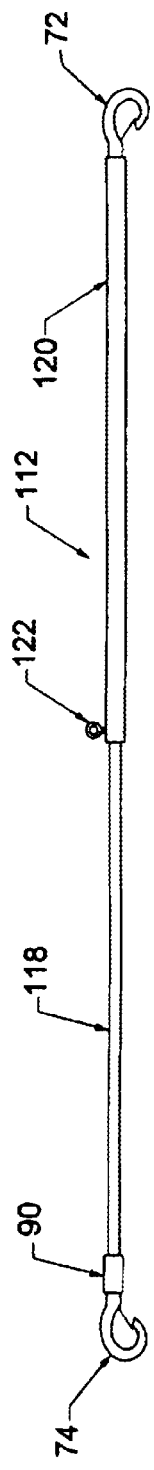
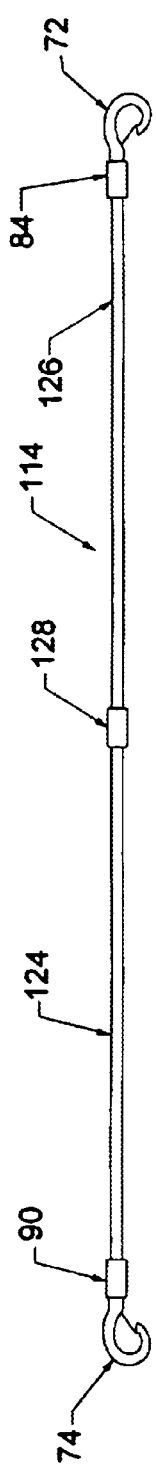
FIG. 6
FIG. 7
FIG. 8

PROTECTOR FOR VEHICLES

This application claims the benefit of provisional application No. 60/258,542 filed Dec. 29, 2000.

This invention relates to protectors for vehicles. The protector is a sheet of material attached between two vehicles, one of which is towing the other, beneath the towbar connecting the vehicles. One vehicle tows the other. Automobile, truck and the like may tow a trailer, or a motor home may tow an automobile. The protector prevents the prime mover (towing vehicle) rear and the front of the towed vehicle from flying debris thrown up from the road and exhaust fumes from the prime mover.

BACKGROUND & PRIOR ART

Applicant is aware of three recent patents, two are related U.S. Pat. No. 5,829,775, issued Nov. 3, 1998 and U.S. Pat. No. 6,022,038, issued Feb. 8, 2000, both to Maxwell, et al., and U.S. Pat. No. 6,196,587, issued Mar. 6, 2001, to Sage, all of which are made of reference. Both Maxwell patents teach the identical protector extending between vehicles, which may be of any suitable material formed in various ways, connected to both vehicles and arranged in numerous ways. Sage teaches a protector having corner clips, connected by elastic material through edge channels, which are taught but not claimed as forming one continuous strip.

Protectors are a recent development and apart from these patents covering protectors called RV UndeR-Skirt™, applicant is not aware of closely related prior art.

It is a general object of the invention to provide a protector to be connected between a towed vehicle and a towing vehicle to protect both vehicles, tow bar apparatus, wiring harness, and safety cables, and bicycles carried on either vehicle, from material thrown up or splashed from the road, or other surface traversed, which is quadrilateral with opposed substantially parallel ends, so that each end may abut and protect each vehicle, with a peripheral channel through which an endless cable, or cord may be passed. It is a subsidiary object of the invention that the cable or cord be elasticized. It is a further subsidiary object of the invention to provide snaplinks or karabiners (also karabiners, carabiners, or caribiners) to attach to the cable or cord, at the corners of the protector, to the vehicles. It is a further subsidiary object of the invention to have extra end karabiners to attach to the cable or cord at end nearest the towing vehicle. It is a further principal object to provide a support bar to pass over a tow bar connecting two vehicles holding up a protector beneath the tow bar. It is a further subsidiary object of the invention to provide a middle or central loop of cord or cable attached to the middle of the protector to pass the support bar through to support the middle of the protector. It is a further subsidiary object of the invention to provide eyebolts for the vehicles to attach the snaplinks or karabiners to. Other objects of the invention will be apparent to those skilled in the art from the following specification, statement of invention claimed and accompanying drawings.

DESCRIPTION OF THE INVENTION

In a first broad aspect the invention is directed to a vehicle protector, which has a sheet having a first end to connect to a first towing vehicle and a second end to connect to a second towed vehicle, and opposed sides connecting the ends. The sheet has anchors at the corners thereof, at the first end for the towing vehicle at the second end for the towed vehicle, the first end has two additional anchors at two points on the first end for the towing vehicle. Preferably the sheet has peripheral channels at the edge, and endless first elasticized cable means passing through the channels, which have corner exposures, exposing the first elasticized cable means. Additionally the first towing end of the protector has two median exposures, also exposing the end less first elasticized cable means. These exposures allow karabiner links to engage the endless first elasticized cable means at the corner and median exposure. The protector in use will be beneath a tow bar connecting the vehicles. Preferably karabiner links engage the endless first elasticized cable at corner and median exposures, which allows each karabiner link at the first end of the sheet to engage an eyebolt mounted on the first towing vehicle, and each karabiner link at the second end of the sheet to engage an eyebolt mounted on the second towed vehicle. Preferably the elasticized cable is a bungee cord.

In a second broad aspect the invention is directed to a vehicle protector, having a sheet with a first end to connect to a first towing vehicle and a second end to connect to a second towed vehicle, and opposed sides connecting the ends. The sheet has anchors at the corners thereof, at the first end for the towing vehicle at the second end for the towed vehicle. The sheet also has opposed anchors on the sides thereof to engage a transverse support bar passing above a tow bar connecting the vehicles. Preferably the sheet has peripheral channels at the edge, and endless first elasticized cable means passing through the channels, which have corner exposures, exposing the first elasticized cable means, whereby karabiner links may engage the endless first elasticized cable means at each corner exposure. The protector in use will be beneath a tow bar connecting the vehicles. The opposed side channels have side middle exposures, exposing the first elasticized cable means, whereby terminal hooks of a support bar passing over the tow bar in use may engage the first elasticized cable means at the side middle exposures and support the vehicle protector in use.

In a third broad aspect the invention is directed to a vehicle protector, having a sheet with a first end to connect to a first towing vehicle and a second end to connect to a second towed vehicle, and opposed sides connecting the ends. The sheet has anchors at the corners thereof, at the first end for the towing vehicle at the second end for the towed vehicle. The first end has two additional anchors at two points on the first end for the towing vehicle. Also the sheet has opposed anchors on the sides thereof to engage a transverse support bar passing above a tow bar connecting the vehicles. Preferably the sheet has peripheral channels at the edge, and endless first elasticized cable means passing through the channels, which have corner exposures, exposing the first elasticized cable means. The first towing end of the protector has two median exposures, exposing the first elasticized cable means, whereby karabiner links may engage the endless first elasticized cable means at each corner and median exposure. The protector in use will be beneath a tow bar connecting the vehicles. The opposed sides channels have side middle exposures, exposing the first elasticized cable means, whereby terminal hooks of a support bar passing over the tow bar in use may engage the first elasticized cable means at the side middle exposures and support the vehicle protector in use.

Both second and third aspects of the invention preferably have karabiner links engage the endless first elasticized cable means at the corner (and median, when present) exposures, whereby each karabiner link at the first end of the sheet can engage an eyebolt mounted on the first towing vehicle, and each karabiner link at the second end of the sheet can engage an eyebolt mounted on the second towed vehicle. Preferably the sheet has a grommet in the middle, which secures a loop of third elasticized cable means, above the sheet in use. Stop means secure the ends of the third elasticized cable means, beneath the sheet in use, whereby the support bar may be passed through the loop, supporting the sheet. Preferably the terminal hooks of the support bar engage the first elasticized cable means at the side middle exposures, more preferably the support bar passes through the loop. Preferably a connecting member extends between the terminal hooks of the support bar, whereby the support bar rests ontop and transverse of a tow bar. The support bar may comprise a single tube to receive the terminal hooks. It also may comprise two end tubes and a middle tubular collar, the end tubes receiving the terminal hooks, the middle collar engaging both end tubes. Again it may comprise opposed end tubes and a middle tube, and opposed middle tubular collars, the end tubes receiving the terminal hooks, the middle collars engaging one of the end tubes and the middle tube. Preferably the terminal hooks are received in end tubular joints fitting onto the tubes. The terminal hooks may be connected by a second elasticized cable means. All the elasticized cables may be bungee cords. The support bar may also comprise two tubes, a larger tube sliding telescopically over a smaller tube. Set screw means in the larger tube fixedly engage the smaller tube in relative position. The smaller tube receives one terminal hook, the larger tube receives the other terminal hook. Preferably one terminal hook is received in an end tubular joint fitting onto the smaller tube. When the third elasticized cable means is a bungee cord, then stop means is a bungee ball.

In a fourth broad aspect the invention is directed to a support bar for a vehicle protector. The support bar comprises a connecting member extending between terminal hooks. The support bar may comprise a single tube to receive the terminal hooks. It also may comprise two end tubes and a middle tubular collar, the end tubes receiving the terminal hooks, the middle collar engaging both end tubes. Again it may comprise opposed end tubes and a middle tube, and opposed middle tubular collars, the end tubes receiving the terminal hooks, the middle collars engaging one of the end tubes and the middle tube. Preferably the terminal hooks are received in end tubular joints fitting onto the tubes. The terminal hooks may be connected by a second elasticized cable means. The elasticized cables may be bungee cords. The support bar may also comprise two tubes, a larger tube sliding telescopically over a smaller tube. Set screw means in the larger tube fixedly engage the smaller tube in relative position. The smaller tube receives one terminal hook, the larger tube receives the other terminal hook. Preferably one terminal hook is received in an end tubular joint fitting onto the smaller tube.

In a fifth broad aspect the invention is directed to a kit for a vehicle protector comprising the above described vehicle protector, sufficient karabiners, the above described support bar, and a plurality of eyebolts to attach to the vehicles.

BRIEF DESCRIPTION OF THE DRAWINGS

FIG. 2 shows a side elevational view of a support bar of the invention.

FIG. 3 shows a support bar of FIG. 2 in extended position.

FIG. 6 shows a second embodiment of the support bar of FIG. 2.

FIG. 7 shows a third embodiment of the support bar of FIG. 2.

FIG. 8 shows a fourth embodiment of the support bar of FIG. 2.

DESCRIPTION OF THE PREFERRED EMBODIMENTS

Figure 1:
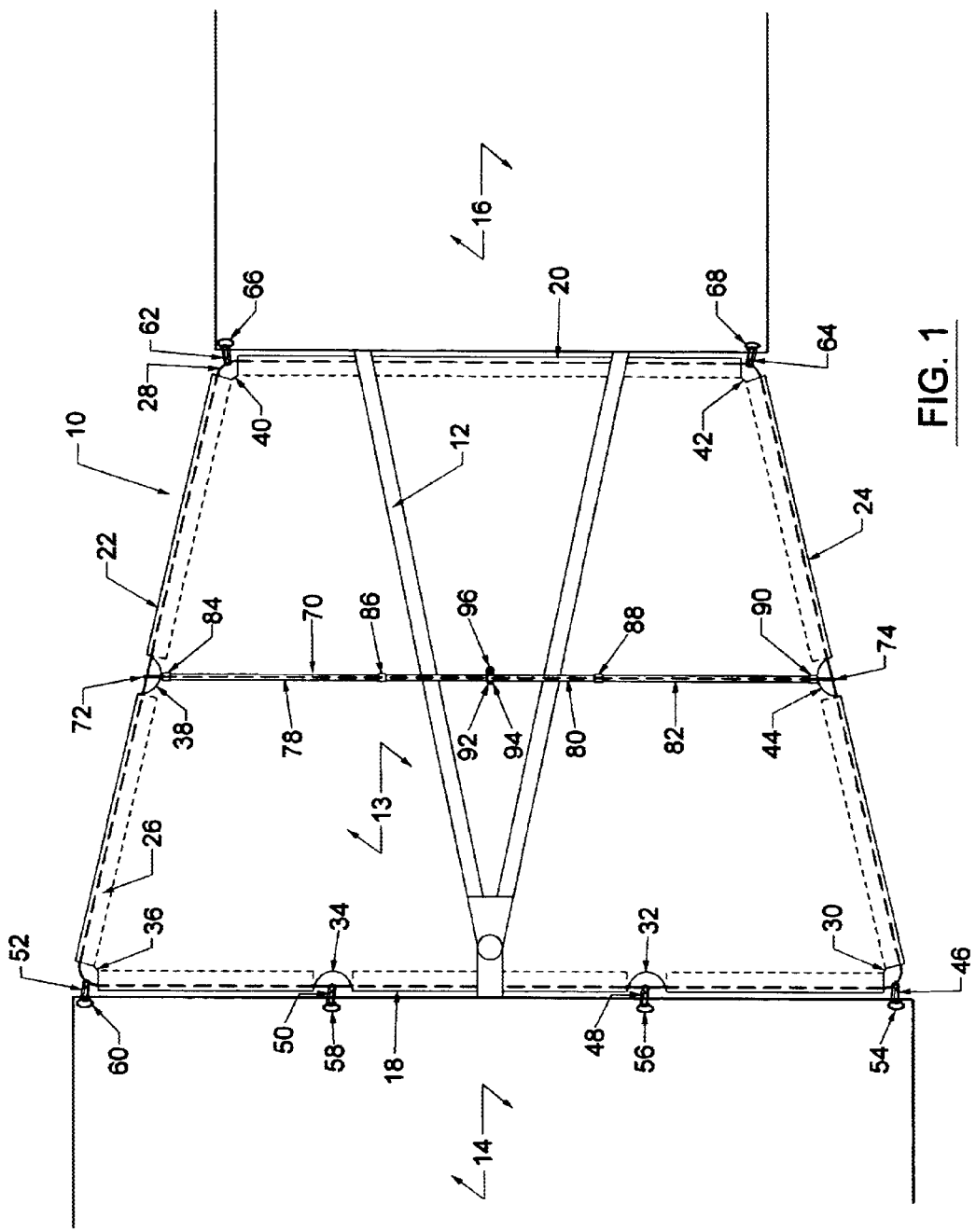
FIG. 1 shows a top plan view of an embodiment of the invention.
Figure 5:
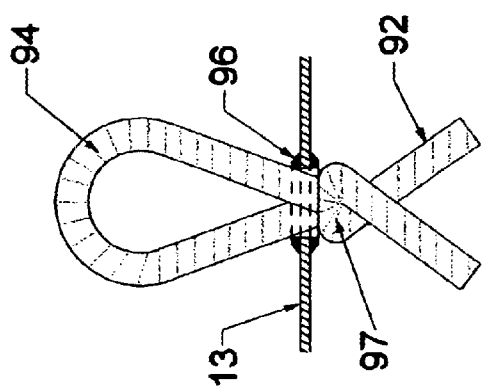
FIG. 5 shows a support loop of the invention.
Figure 4:
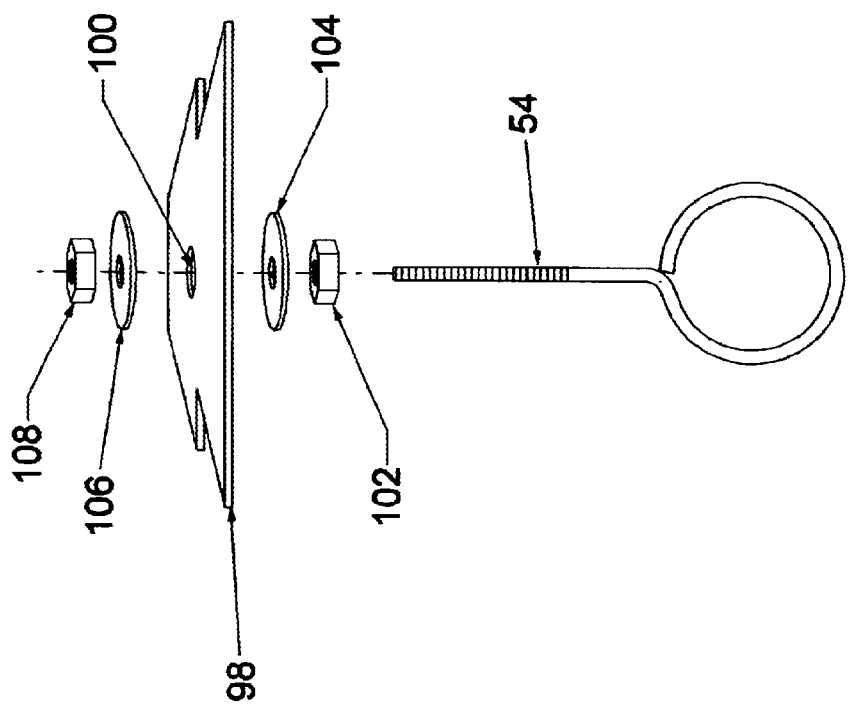
FIG. 4 shows an eyebolt attachment of the invention.

The invention is now illustrated by reference to preferred embodiments thereof. Numeral 10 refers to a protector of the invention, which is stretched beneath tow bar 12 attaching towing vehicle 14, in this case a motor home, to towed vehicle 16, in this case an automobile. Protector 10 has a sheet 13 made of suitable material as known to those skilled in the art, most preferred is a nylon mesh with a pvc coating, which is used by gravel trucks to cover their load. Other possible materials are fabric, cloth, fireproof or otherwise, plastic sheeting, fencing of suitable mesh size, fibreglass, flexible foil, metal mesh, nylon, plastic, canvas, metal foil, screening, perforated plate, which may be used instead as known to those skilled in the art. Sheet 13 is shown as having generally parallel ends, 18 and 20, and in this case angled sides 22 and 24. As the angle of the sides is determined by the breadth of the vehicles to be protected, the protector may be approximately rectangular when the vehicles are the same width, or may be trapezoidal when the vehicles are of different widths, as is readily understood by those skilled in the art. Generally the protector is used for a motorhome towing an automobile, both of which have standard widths, or an automobile towing a trailer, again both vehicles have standard widths. The protector has a peripheral channel 26, formed by folding the fabric edge back and under the sheet approximately 2" and attaching it to central sheet 13 by stitching or other suitable attachment means. Monofilament and cotton thread perished or shrank within twelve months, while nylon and polyester thread were found satisfactory. Peripheral channel 26 contains a continuous (endless) elasticized cord 28, typically a bungee, or chock cord, or the like, which has its ends spliced, sewn or knotted together. While other cables, wires and ropes could used, which are elastically deformable, these are less preferred. Cord 28 can easily deform elastically without parting when the protector is attached, or the vehicles go round a corner. It can also easily slide in channel 26. A number of exposures, 30, 32, 34, 36, 38, 40, 42, 44, in protector 10, expose cord 28 in channel 26. The edge exposures 32, 34, 38, 44, are halfmoon and approximately 1" across into channel 26. The corner channel fabric, which would otherwise overlap under the sheet corner, is folded back or cutaway below the sheet fabric corner leaving cord 28 exposed. This allows attachments to be made to cord 28. End 18 of protector 10 is attached at cord 26 by karabiners (snaplinks) 46, 48, 50, 52, to eyebolts 54, 56, 58 and 60 mounted on the body of towing vehicle 14. End 20 of protector 10 is similarly attached at cord 26 by karabiners 62, 64 to eyebolts 66 and 68 mounted on the body of vehicle 16. The karabiners allow cord 28 to slide easily through them going round corners. Applicant found that when central eyebolts 56 and 58, karabiners 48 and 50 and exposures 32 and 34 are omitted, that the protector sheet distorts, but does not restore to its original position when the vehicles straighten, because cord 26 slides and binds in distorted position, giving a twisted protector sheet. It was found that two median eyebolts, karabiners and exposures on the lead towing vehicle prevent this occurring. Extra eyebolts, karabiners and exposures on the towed vehicle were not needed. It is possible that a single eyebolt, karabiner, and exposure would work, but this was not possible because of the presence of the tow bar receiver. Optionally and preferably support bar 70 is present, which passes over tow bar 12, and is connected to cord 26 at exposures 38 and 44, by hooks 72 and 74, these are typically adjustable shock cord hooks, which may be plastic, or non-rusting metal, which may be galvanized. Support bar 70 has three tubes 78, 80, 82, typically ½" or ¾" pvc electrical conduit pipe (rigid conduit), connected by end tubular joints 84, 90 to hooks 72 and 74, and to each other by middle tubular joints 86, 88. These tubular joints are typically ½" or ¾" pvc couplings, whose i.d. fits over the pipe o.d., also hooks 72 and 74 pressure fit snugly into these couplings. The tubular joints allow folding of the cross bar for storage. The plastic pipe was found sufficiently flexible to give in use and sufficiently rigid to hold the protector in shape.

When the tubes are plastic preferably elasticized cord 76 runs from hook 72 to hook 74 through tubes and joints as shown in FIGS. 2 and 3. The tubes are ideally identical in length so that they can be easily folded together, with hooks 72 and 74 remaining in place. Cord 92 forms loop 94 attached to the middle of protector 10 at grommet 96, by a knot or ball bungee 97. Cords 76 and 92 are elasticized and typically bungee or chock cords or the like. Peripheral cord or cable 26 allows temporary distortion or deformation of protector 10 at installation or cornering. Support bar 70 holds protector 10 up at edges 22 and 24 when cornering, similarly loop 94 of cord 92 holds the middle of protector 10 up when cornering.

Alternatively support bar 70 may be replaced by one of support bars 110, 112, 114, which fullfill the same or similar function.

Support bar 110 has single tube 116 typically ½" or ¾" plastic pipe of flexible nature, as understood by those skilled in the art, connected by end tubular joints 84, 90 to hooks 72 and 74. Alternatively seamless aluminum tubing may be used, typically ¾" or ⅞". In which case hooks 72 and 74 are set directly in the tube ends, without connecting bungee cords or the like.

Support bar 112 has two tubes 118 and 120, 110 is typically ½" or ¾" pvc electrical conduit pipe (rigid conduit), while 112 is typically ½" or ¾" pvc electrical conduit tube (rigid conduit) having i.d. to slide telescopically over pipe 118 o.d., set screw 122 allows the relative position of pipe 110 and tube 112 to be adjusted and locked in position. Pipe 118 is connected by connected by end tubular joint 90 to hook 74, hook 72 is set directly into the end of tube 120. When seamless aluminum tubing is used tube 118 typically ¾" slides inside tube 120 typically ⅞" through a joiner section, which includes a set screw.

Support bar 114 has two tubes 124, and 126 typically ½" or ¾" pvc electrical conduit pipe (rigid conduit), connected by end tubular joints 84, 90 to hooks 72 and 74. Tubes 124 and 126 are connected by middle tubular joint 128, which is a ½" or ¾" pvc coupling, whose i.d. fits over the pipe o.d.

Like support bar 70, hooks 72 and 74 are preferably connected by an elasticized cord or cable, for example bungee cord, running through the interior of support bars 110, 112 and 114, when these are plastic.

Although embodiments of support bars are shown above, only terminal hooks 72 and 74 are essential together with an intervening flexible bar or tube such as 116. While in practice joints 84, 90, are convenient to receive terminal hooks 72 and 74, these joints can be omitted and the hooks mounted directly into tube 116. by gluing, welding or the like. Similarly terminal hook 74 can be directly mounted in tube 118 or tube 124, while terminal hook 72 can be mounted directly in tube 126. When the support bar is foldable as in bar 70, bar 126 or telescopic as in bar 122, connecting hooks 72 and 74 by elasticized cable is convenient. It can be used in bar 110 as well.

Tube dimensions given are typically those commercially available in North America, and are illustrative in nature.

Eyebolt 54 (exemplified) is attached to vehicle body 98, in this case of vehicle 14, but as those skilled in the art would be aware is could also be the body of vehicle 16. Hole 100 is drilled in body 98 and eyebolt 54 is passed through it and secured by nuts 102 and 108 and washers 104 and 106.

Although as illustrated the larger vehicle 14 tows the smaller 16, the reverse may occur, in which case although the smaller end of the protector would be attached to the towing vehicle, it would require two middle exposures, karabiners and eyebolts.

In use the vehicles are coupled and protector 10 is attached at each end to the vehicles by clipping the end and corner karabiners to the eyebolts. Generally the protector is supplied with its karabiners already attached to the bungee cord. The support bar is then passed over the towbar and through the support loop then clipped at each end to the bungee cord in the side exposures. Generally and conveniently both protector and its associated support bar are folded and stored in a bag when not in use.

Although the invention is described and referred to specifically as it relates to specific components, devices and structures for protectors it will be understood that the principles of this invention are equally applicable to similar components, devices, structures for devices and accordingly, it will be understood that the invention is not limited to such components, devices, and structures for protectors.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. Vehicle protector, comprising a sheet having a first end for connecting a first towing vehicle and a second end for connecting a second towed vehicle, and opposed sides connecting said ends, said sheet having anchors at the corners thereof, at the first end for said towing vehicle at the second end for said towed vehicle, said sheet having opposed anchors on the sides thereof to engage a transverse support bar passing above a tow bar connecting said vehicles.

2. Vehicle protector of claim 1, said sheet having peripheral channels at the edge, and endless first elasticized cable means passing through said channels, said channels having corner exposures, exposing said first elasticized cable means, whereby karabiner links may engage said endless first elasticized cable means at each said corner exposure, and said protector in use will be beneath a tow bar connecting said vehicles, and wherein said opposed sides channels have side middle exposures, exposing said first elasticized cable means, whereby terminal hooks of a support bar passing over said tow bar in use may engage said first elasticized cable means at said side middle exposures and support said vehicle protector in use.

3. Vehicle protector of claim 2, wherein said terminal hooks of said support bar engage said first elasticized cable means at said side middle exposures.

4. Vehicle protector of claim 2, wherein said sheet has a grommet in the middle thereof, said grommet securing a loop of third elasticized cable means, above said sheet in use, and stop means securing the ends of said third elasticized cable means, beneath said sheet in use, whereby said support bar may be passed through said loop, supporting said sheet.

5. Vehicle protector of claim 4 wherein said terminal hooks of said support bar engage said first elasticized cable means at said side middle exposures and said support bar passes through said loop.

6. Vehicle protector of claim 1, said first end having two additional anchors at two points on said first end for said towing vehicle.

7. Vehicle protector of claim 6, said sheet having peripheral channels at the edge, and endless first elasticized cable means passing through said channels, said channels having corner exposures, exposing said first elasticized cable means, and said first towing end of said protector has two median exposures, exposing said first elasticized cable means, whereby karabiner links may engage said endless first elasticized cable means at each said corner and median exposure, and said protector in use will be beneath a tow bar connecting said vehicles and wherein said opposed sides channels have side middle exposures, exposing said first elasticized cable means, whereby terminal hooks of a support bar passing over said tow bar in use may engage said first elasticized cable means at said side middle exposures and support said vehicle protector in use.

8. Vehicle protector of claim 7, wherein said terminal hooks of said support bar engage said first elasticized cable means at said side middle exposures.

9. Vehicle protector of claim 7, wherein said sheet has a grommet in the middle thereof, said grommet securing a loop of third elasticized cable means, above said sheet in use, and stop means securing the ends of said third elasticized cable means, beneath said sheet in use, whereby said support bar may be passed through said loop, supporting said sheet.

10. Vehicle protector of claim 9 wherein said terminal hooks of said support bar engage said first elasticized cable means at said side middle exposures and said support bar passes through said loop.

11. Vehicle protector of claim 1, said support bar comprising a connecting member extending between terminal hooks.

12. Vehicle protector of claim 11, said support bar comprising a single tube to receive said terminal hooks.

13. Vehicle protector of claim 11, said support bar comprising two end tubes and a middle tubular collar, said end tubes receiving said terminal hooks, said middle collar engaging both end tubes.

14. Vehicle protector of claim 11, said support bar comprising opposed end tubes and a middle tube, and opposed middle tubular collars, said end tubes receiving said terminal hooks, each said middle collar engaging one of said end tubes and said middle tube.

15. Vehicle protector of claim 11, wherein said terminal hooks of said connecting member are received in end tubular joints fitting onto said connecting member.

16. Vehicle protector of claim 11, wherein said terminal hooks of said support bar are connected by elasticized cable means.

17. Vehicle protector of claim 16, said support bar comprising two tubes, a larger tube sliding telescopically over a smaller tube, set screw means in said larger tube to fixedly engage said smaller tube in relative position, said smaller tube receiving one said terminal hook, said larger tube receiving the other terminal hook.

18. Vehicle protector of claim 17, wherein one said terminal hook of said support is received in an end tubular joint fitting onto said smaller tube.

* * * * *